Figure 1:
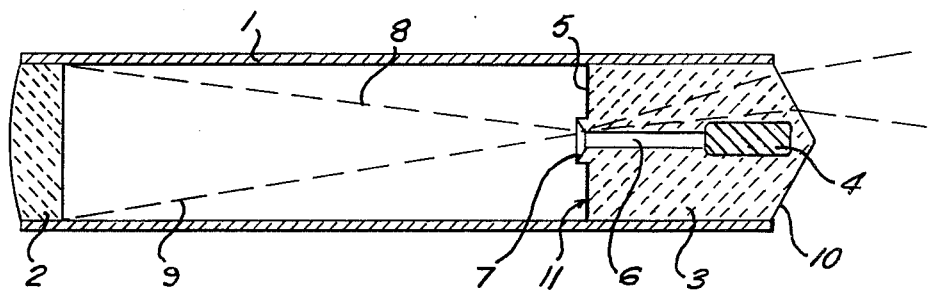

United States Patent [19]
Budden et al.

[11] 4,136,963
[45] Jan. 30, 1979

[54] COLLIMATOR GUNSIGHT

[75] Inventors: Raymond G. Budden, Havant; Fraser Scott; Ivan F. R. Dickinson, both of Guildford, all of England

[73] Assignee: Ring Sights Limited, Guildford, England

[21] Appl. No.: 784,659

[22] Filed: Apr. 5, 1977

[30] Foreign Application Priority Data

Apr. 9, 1976 [GB] United Kingdom ............... 14595/76

[51] Int. Cl.² ............................................. G02B 27/34
[52] U.S. Cl. ...................................... 356/251; 33/241
[58] Field of Search .......................... 350/10; 250/467; 33/241; 356/247, 251, 253–255

[56] References Cited
U.S. PATENT DOCUMENTS 3,880,529   4/1975   Althause et al. ..................... 356/251

*Primary Examiner*—F. L. Evans
*Attorney, Agent, or Firm*—Mawhinney & Mawhinney & Connors

[57] ABSTRACT

A collimator gunsight has a collimator lens, a transparent graticule in the focal plane of the lens, and a window behind the graticule. A small artificial light source is positioned between the graticule and the window but does not obscure the ambient light entering the window from illuminating the graticule. The graticule pattern has a first portion through which light from the artificial source can pass into the aperture of the collimator lens, and a second portion which diverts, e.g. by refraction, ambient light entering the window and by-passing the artificial source so as to fill the aperture of the lens.

9 Claims, 2 Drawing Figures

COLLIMATOR GUNSIGHT

The present invention relates to gunsights and in particular to the class of gunsight known as the collimator sight. With such collimator sights, a graticule pattern is illuminated against a dark background and the light from the pattern is collimated for presentation to one eye of the user of the weapon as an image at infinity. If the other eye of the user is free to view a target, for example, and the relative brightness levels of the target and the collimator pattern are correctly balanced, the user will perceive the collimator pattern superimposed on the viewed target.

The graticule pattern typically comprises a cross-hair pattern or a single dot providing an aiming point. If the sight is correctly aligned on the weapon, an operator can aim the weapon simply by placing the cross-hairs or spot on the target. For most individuals, the eyes will align parallel to one another when focused at infinity and, thus, the weapon is correctly aimed. The above arrangement is known as a direct collimator sight.

Between 9 and 10% of individuals suffer from "eye wander" and their eyes do not reliably align parallel with each other when focused at infinity. It is possible to reduce this problem by employing a plane glass, prismatic or "half-silvered mirror" arrangement optically to superimpose the target image and the graticule pattern for presentation simultaneously to one or both eyes of the user. This arrangement is known as a reflex collimator sight. If the target and graticule pattern are presented to both eyes, no eye wander occurs.

It is important that the brightness of the graticule pattern is correctly balanced with that of the target. Particularly when the target and pattern are viewed by separate eyes, lack of brightness balance will produce the effect of "retinal rivalry", whereby one of the pattern or target will be perceived in preference to the other. Thus, it is usually necessary for the brigthness of the graticule pattern to be adjusted in accordance with changes in the target brightness. With reflex collimator sights, light is absorbed in the reflecting elements and it is especially difficult to achieve the desired brighntess balance under all conditions of illumination from bright sun to near darkness.

When the gunsight is used in daylight, or relatively good light conditions, it is convenient to illuminate the graticule pattern by ambient light, so that the brightness of the graticule pattern is always balanced with the brightness of the target. However, at low ambient light levels, or at night, it becomes necessary to illuminate the graticule pattern by artificial light. Normally, the graticule pattern is a transparent pattern on an opaque background which is illuminated from behind. Such illumination from behind presents no problems with ambient light which can, for instance, enter the body of the sight through a suitable window. However, it has been normal practice hitherto either to employ a separate artificial light source which is fitted to the sight when required or to have a permanently attached light source which is arranged to be movable into or out of the active position, behind the graticule pattern, according to the ambient light level. The problem has been that the artificial light source tends to obscure the illumination of the graticule pattern by ambient light, if permanently in the active position. "Add on" or movable light sources, as used hitherto, can be damaged or lost, when in service, and, in any case, require the constant attention of the user of the weapon.

According to the present invention a collimator gunsight comprises a body containing a collimator lens, means forming a transparent graticule pattern in the focal plane of the collimator lens, a window to ambient light behind the graticule forming means and an artificial light source between the graticule forming means and the window, which source is sufficiently small that ambient light entering the body through the window can illuminate the graticule pattern by-passing the source, the graticule forming means having a first transparent portion through which light from the artificial source passes into the aperture of the collimator lens and a second transparent portion through which ambient light entering the body through the window and by-passing the artificial light source is diverted substantially to fill the aperture of the collimator lens. There is thus provided a collimator gunsight with a fixed artificial light source, which is typically a radioactive source (beta light), and yet obviating the problem of obscuration of the graticule pattern by the source. The second transparent portion of the graticule pattern is arranged to divert ambient light from the window, which would otherwise be absorbed in the walls of the sight body, into the aperture of the collimator lens.

Conveniently the artificial light source is centred on the optical axis of the collimator lens. Then, the means forming a transparent graticule pattern may comprise an opaque disc having a transparent circular aperture centred on said optical axis, the circular aperture having a circular center portion constituting said first transparent portion and an annular portion constituting said second transparent portion. Thus, the graticule pattern, when viewed through the collimator lens, appears as a central illuminated spot under low ambient light conditions, the spot corresponding to the circular centre portion of the pattern which is illuminated by the artificial light source. Under higher ambient light conditions, the graticule pattern appears as a circle surrounding the spot which now appears dark compared with the considerably greater illumination of the circle corresponding to the annular portion of the graticule.

Said annular portion may be defined by a refracting body or refracting portion of a body of transparent solid material, which refracting body or portion is symmetrical about said optical axis and shaped to refract ambient light from said window such that, in any plane containing said optical axis, ambient light rays which by-pass the artificial light source and illuminate said annular portion without crossing said optical axis are refracted in the plane by the refracting body or portion so as to enter the aperture of the collimator lens.

In a preferred embodiment the gunsight includes a body of transparent solid material within the body of the sight, having an inner end at the focal plane of the collimator lens and an outer end exposed to ambient light and defining said window, the artificial light source being located within the transparent body and said annular portion being defined by a surface portion of the inner end of the transparent body, said surface portion having the form of the curved surface of a frusto-cone with its larger base nearest to the collimator lens. With such an arrangement the artificial light source can be supported in the body of the sight centrally on the optical axis of the collimator lens without the need for supporting members which might further obscure the graticule pattern. It will be understood that with a radioactive light source, there is no requirement for any electrical leads from the source.

Said circular centre portion of the graticule pattern may comprise a further surface portion of the inner end of the transparent body, which further portion is planar and in the focal plane of the collimator lens. Since this further surface portion is planar, light from the artificial source can pass out of the transparent body through the circular centre portion, substantially without deflection, so as to enter the aperture of the collimator lens. However, light from the artificial source illuminating the annular portion of the graticule pattern is deflected thereby away from the aperture of the collimator lens.

Alternatively, said circular centre portion may be defined by the mouth of a cylindrical bore coaxial with said optical axis and extending in the transparent body from the inner end to the artificial light source.

Conveniently, the gunsight is a reflex collimator gunsight and it includes reflecting means arranged for combining optically, for simultaneous viewing by one or each eye of an operator, the collimated image of the graticule pattern and a view of the target.

Figure 2:
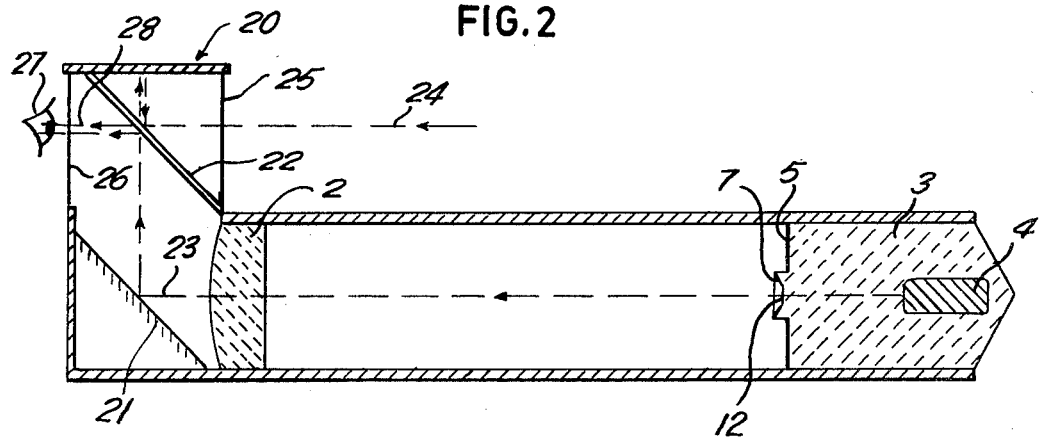

Examples of the present invention will now be described in more detail with reference to the accompanying drawings, in which:

FIG. 1 illustrates in axial cross-section a first embodiment of a gunsight according to the invention; and FIG. 2 illustrates in axial cross-section a second embodiment.

Referring to FIG. 1, there is shown a gunsight having an opaque tubular body 1 containing at one end a collimator lens 2. At the other end of the body 1 there is a transparent body 3 in which there is mounted an artificial light source 4 so as to be centred on the optical axis of the collimator lens 2. The transparent body 3 has an inner end 5 at the focal plane of the collimator lens and an outer end 10 forming a window through which ambient light can enter the body 1. At the inner end of the transparent body 3 there is formed a graticule pattern comprising an opaque disc 11 having a circular aperture centred on the optical axis. The disc 11 may comprise a coat of opague paint on the inner end surface of the transparent body 3 or, alternatively, an opaque mask fitting against the inner end face.

The transparent graticule pattern formed by the circular aperture in the opaque disc 11 is divided into a central circular portion centred on the optical axis and an annular portion surrounding the central portion. The central portion is defined by the mouth of a cylindrical bore 6 through the transparent body 3 from the inner end face 5 thereof to the artificial light source 4. The bore 6 is coaxial with the optical axis. The annular portion of the graticule is formed by a shaped surface portion of the inner end 5 of the cylindrical body 3. The shaped surface portion has the form of the curved surface 7 of a frusto-cone with its larger base nearest to the collimator lens 2.

The frusto-conical shaped surface 7 is effective to refract rays of ambient light entering the body 1 through the window defined by the outer end 10 of the transparent body 3. In any plane containing the optical axis, ambient light rays 8 and 9 passing through the inner edge of the frusto-conical surface 7 are refracted by the surface 7 so that those rays in the plane required to fill the aperture of the collimator lens 2 are unobstructed by the artificial light source 4.

The outer end 10 of the transparent body may be shaped to refract light entering the transparent body 3 so that the light illuminating the annular portion of the graticule pattern is drawn from an area adjacent the target. For this purpose, the outer end 10 has the conical shape illustrated. However, in some applications it may be desirable to draw the ambient light from elsewhere, e.g. the sky, in which case the outer end 10 may be shaped suitably to refract incoming ambient light from the sky.

In operation in relatively high ambient light level conditions, light entering the transparent body through the window formed by the outer end 10 illuminates the frusto-conical surface 7 of the annular portion of the graticule pattern and is refracted thereby to fill the aperture of the collimator lens 2. Thus, on viewing the graticule pattern through the collimator lens, the pattern appears as a circle which may be used as the aiming mark of the sight. The ambient light from the frusto-conical surface is brighter than light from the artificial source 4, so that the central portion of the graticule pattern defined by the mouth of the bore 6 appears dark. However, under low ambient conditions, light from the artificial source 4 emerging from the mouth of the bore 6 enters the collimator lens 2 so that the graticule pattern when viewed through the lens appears as a central dot defined by the mouth of the bore 6.

FIG. 2 illustrates a modified embodiment which is similar to that shown in FIG. 1, except that instead of having a bore 6, the central portion of the graticule pattern is defined by a circular planar portion 11 of the inner end face of the transparent body 3. Under low ambient light conditions, light from the artificial source 4 passing through the transparent body 3 and exiting through the planar surface portion 11 is not substantially deflected and enters the aperture of the lens 2. However, light from the source 4 reaching the frusto-conical surface 7 of the annular portion of the graticule pattern is deflected thereby away from the aperture of the lens and is absorbed in the opaque body 1 of the sight. Thus, on viewing the graticule pattern through the collimator lens 2 under low ambient light conditions, the graticule pattern appears as a central dot defined by the circular planar surface 11. Under high ambient light conditions, the sight of FIG. 2 operates in the same way as described above in connection with the sight of FIG. 1.

The sight of FIG. 2 is also modified with respect to that of FIG. 1 in that it constitutes a reflex collimator sight. For this purpose, a beam splitting reflecting means 20 is provided on the viewing side of the collimator lens 2, which comprises a plane mirror 21 and a half-silvered mirror 22 parallel to each other and at 45 degrees to the optical axis of the lens 2. Light, such as ray 23, passing through the lens 2 is reflected by mirror 21 towards the mirror 22. At the mirror 22, a proportion of the light from the lens 2 is reflected again and combined with a proportion transmitted through the mirror 22 of the light, such as ray 24, from the target entering through a window 25. Thus the combined light, such as rays 28, from the mirror 22 exits from the sight body through a window 26, and an eye 27 of an operator of the sight can view through the window 26 an image of the collimator pattern superimposed on the target.

Of course, the reflecting means 20 may also be used in the sight of FIG. 1. Also, other arrangements of mirrors and/or prisms may be employed in the reflecting means to provide the same function. Furthermore, it is envisaged that a similar arrangement may be used to present the combined image of the graticule pattern and the target to both eyes of the operator simultaneously.

The collimator lens 2, which is shown as a single lens in FIGS. 1 and 2 may of course comprise a combination of separate lenses. The artificial light source 4 may be any suitable light source but is preferably a radioactive light source such as a beta light, requiring no electrical connections or batteries. Instead of a transparent body 3, the artificial light source 4 may be supported coaxially in the sight by other means, such as radially extending stays, and the annular portion of the graticule pattern may be defined by a small annular refracting body providing a similar function to the frusto-conical surface 7. However, if the transparent body 3 is employed, this may be made in one or more pieces to suit the particular application.

We claim:

1. A collimator gunsight comprising a body containing a collimator lens, means forming a transparent graticule pattern in the focal plane of the collimator lens, a window to ambient light behind the graticule forming means and an artificial light generator located between the graticule forming means and the window, the graticule forming means having a first transparent portion through which light from the artificial light generator passes directly into the aperture of the collimator lens and a second transparent portion, said generator being sufficiently small and so spaced behind the graticule forming means that ambient light entering the body through the window can by-pass the generator to illuminate at least said second portion of the graticule pattern, said second portion being arranged to divert said illuminating ambient light substantially to fill the aperture of the collimator lens.

2. A collimator gunsight as claimed in claim 1 wherein the artificial light generator is centred on the optical axis of the collimator lens.

3. A collimator gunsight as claimed in claim 2 wherein the means forming a transparent graticule pattern comprises an opaque disc having a transparent circular aperture centred on said optical axis, the circular aperture having a circular centre portion constituting said first transparent portion and an annular portion constituting said second transparent portion.

4. A collimator gunsight as claimed in claim 3 wherein said annular portion is defined by a refracting body or refracting portion of a body of transparent solid material, which refracting body or portion is symmetrical about said optical axis and shaped to refract ambient light from said window such that, in any plane containing said optical axis, ambient light rays which by-pass the artificial light generator and illuminate said annular portion without crossing said optical axis are refracted in the plane by the refracting body or portion so as to enter the aperture of the collimator lens.

5. A collimator gunsight as claimed in claim 4 wherein the gunsight includes a body of transparent solid material within the body of the sight, having an inner end at the focal plane of the collimator lens and an outer end exposed to ambient light and defining said window, the artificial light generator being located within the transparent body and said annular portion being defined by a surface portion of the inner end of the transparent body, said surface portion having the form of the curved surface of a frusto-cone with its larger base nearest to the collimator lens.

6. A collimator gunsight as claimed in claim 5 wherein said centre portion of the graticule pattern comprises a further surface portion of the inner end of the transparent body, which further portion is planar and in the focal plane of the collimator lens.

7. A collimator gunsight as claimed in claim 5 wherein the transparent body has a cylindrical bore extending coaxial with said optical axis from the inner end of the body to the artificial light generator, the bore having a circular mouth at said inner end defining said circular centre portion of the graticule pattern.

8. A collimator gunsight as claimed in claim 1 and including reflecting means arranged for combining optically, for simultaneous viewing, by one or each eye of an operator, the collimated image of the graticule pattern and a view of the target.

9. A collimator gunsight as claimed in claim 1 wherein the artificial light generator is a radioactive source.

* * * * *